US011140894B2

(12) United States Patent
Lopac et al.

(10) Patent No.: US 11,140,894 B2
(45) Date of Patent: Oct. 12, 2021

(54) SMART COVER BUG DETERRENT

(71) Applicant: Rosemount Aerospace Inc., Burnsville, MN (US)

(72) Inventors: Mark Stephen Lopac, Cokato, MN (US); Mark Baker, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 147 days.

(21) Appl. No.: 15/934,178

(22) Filed: Mar. 23, 2018

(65) Prior Publication Data

US 2019/0289842 A1 Sep. 26, 2019

(51) Int. Cl.

| | |
|---|---|
| ***A01M 29/34*** | (2011.01) |
| ***A01M 29/12*** | (2011.01) |
| *G01P 5/165* | (2006.01) |
| *G01L 19/14* | (2006.01) |
| *G01P 13/02* | (2006.01) |

(52) U.S. Cl.

CPC ............ *A01M 29/34* (2013.01); *A01M 29/12* (2013.01); *G01L 19/147* (2013.01); *G01P 5/165* (2013.01); *G01P 13/025* (2013.01)

(58) Field of Classification Search

CPC A01M 1/2005; A01M 1/2011; A01M 1/2016; A01M 29/00; A01M 29/12; A01M 29/30; A01M 29/34; A01M 1/00; A01M 1/20; A01M 1/2022; A01M 1/2027; A01M 1/2044; A01M 1/2055; A01M 2200/01; A01M 2200/011; A01M 2200/012

USPC ......... 43/132.1, 124, 125, 129, 131; 52/101; 239/34, 44, 47; 401/196, 11; 15/423

See application file for complete search history.

(56) References Cited

U.S. PATENT DOCUMENTS

| | | | | |
|---|---|---|---|---|
| 2,532,316 A | 12/1950 | Larkin | | |
| 4,973,448 A | 11/1990 | Carlson et al. | | |
| 5,080,654 A * | 1/1992 | Picha | A61M 39/045 604/167.02 |
| 8,132,471 B2 | 3/2012 | DeGroff et al. | | |
| 9,399,125 B2 * | 7/2016 | Burkholz | A61M 39/162 |
| 10,488,428 B1 * | 11/2019 | Hughes | A01M 29/12 |
| 2012/0016318 A1 * | 1/2012 | Hoang | A61M 39/16 604/288.01 |

OTHER PUBLICATIONS

Instructables Insect Repellent DIY, Nov. 25, 2017 (Wayback Machine), Instructables Autodesk Inc. (Year: 2017).*

PubChem Compound Summary Chloroxylenol, Created Mar. 25, 2005, U.S. National Library of Medicine (NIH) (Year: 2005).*

MayoClinic Drugs and Supplements Chlorhexidine (Topical Application Route), Last updated Jan. 1, 2020, MayoClinic (Year: 2020).*

* cited by examiner

*Primary Examiner* — Darren W Ark
*Assistant Examiner* — Katelyn T Truong
(74) *Attorney, Agent, or Firm* — Kinney & Lange, P.A.

(57) ABSTRACT

A cover for a probe head of an air data probe includes a sleeve defining a cavity for enclosing a portion of the probe head of the air data probe, the sleeve including a closed end, an open end opposite the closed end, and an interior surface extending from the open end to the closed end, and a reservoir for holding insect repellent, the reservoir located at least partially within the cavity of the sleeve.

20 Claims, 7 Drawing Sheets

SMART COVER BUG DETERRENT

BACKGROUND

The present disclosure relates generally to air data probes, and in particular, to covers for air data probes.

Air data probes are installed on aircraft to gather pneumatic pressures that permit the measurement of air data parameters, such as speed, altitude, and angle of attack. As such, an air data probe has a probe head with an opening at a front, or upstream, end of the probe to take in air from surrounding airflow. When the aircraft is grounded, bugs are able to enter the air data probe via the opening in the probe head. Once inside, bugs can quickly build nests in the air data probe. The nests in the air data probe interfere with the functionality and accuracy of the air data probe measurements.

SUMMARY

A cover for a probe head of an air data probe includes a sleeve defining a cavity for enclosing a portion of the probe head of the air data probe, the sleeve including a closed end, an open end opposite the closed end, and an interior surface extending from the open end to the closed end, and a reservoir for holding insect repellent, the reservoir located at least partially within the cavity of the sleeve A method for repelling insects from an opening of an air data probe includes placing a cover on a probe head of the air data probe, the cover including a reservoir for holding insect repellent, dispersing the insect repellent from the reservoir onto the probe head, and removing the cover from the probe head.

DETAILED DESCRIPTION

In general, the present disclosure describes a cover for an air data probe that includes a reservoir for holding insect repellent, which transfers onto the probe head of the air data probe. The repellent prevents bugs from nesting in the air data probe when the aircraft is grounded, such as overnight or between flights, and interfering with air data measurements.

Figure 1:
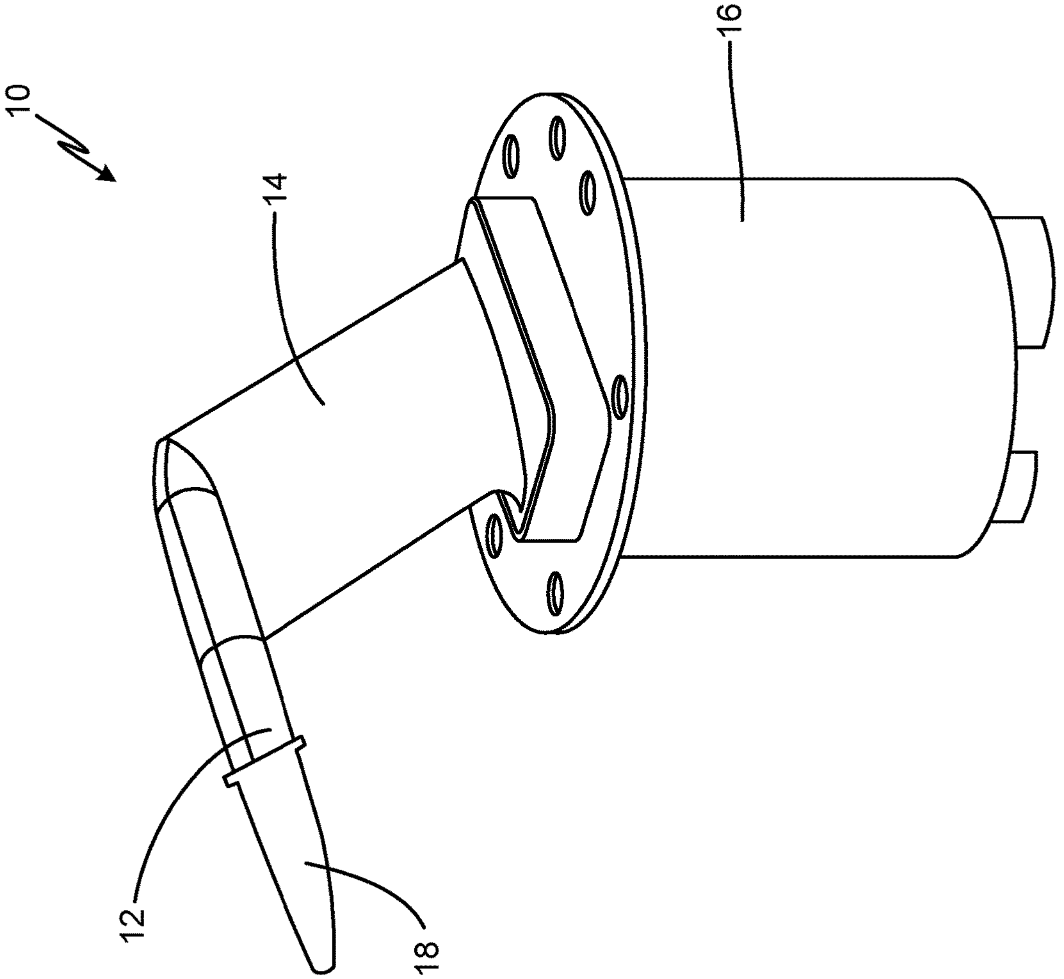
FIG. 1 is a perspective view of a cover on an air data probe.

FIG. 1 is a perspective view of cover 18 on air data probe 10. Air data probe 10 includes probe head 12, strut 14, and housing 16.

Probe head 12 is connected to a first end of strut 14. Probe head 12 is the sensing head of air data probe 10. Probe head 12 has one or more ports positioned in probe head 12. Internal components of air data probe 10 are located within probe head 12. A second end of strut 14 is connected to housing 16. As such, strut 14 connects probe head 12 to housing 16. Strut 14 is blade-shaped. Internal components of air data probe 10 are located within strut 14. Housing 16 may also contain internal components, such as sensors or other electronics, of air data probe 10. In alternate embodiments, air data probe 10 may not include housing 16. Cover 18 is positioned on an end of probe head 12 of air data probe 10.

Air data probe 10 is installed on an aircraft. Air data probe 10 may be mounted to a fuselage of the aircraft via fasteners, such as screws or bolts. Strut 14 holds probe head 12 away from the fuselage of the aircraft to expose probe head 12 to the oncoming airflow outside of the boundary layer. Probe head 12 takes in air from surrounding airflow via the one or more ports positioned in probe head 12. Air pressures from probe head 12 are communicated pneumatically through internal components and passages of probe head 12 and strut 14 to reach internal components within housing 16. Pressure sensors and/or other components within housing 16, or elsewhere in the aircraft, measure the air pressures provided by probe head 12. Air data probe 10 uses the pressure measurements to generate air data parameters related to the aircraft flight condition, such as the speed, altitude, or angle of attack of the aircraft. Cover 18 protects probe head 12 from mechanical damage, such as scratches or dents, which may interfere with the function of air data probe 10.

Figure 2A:
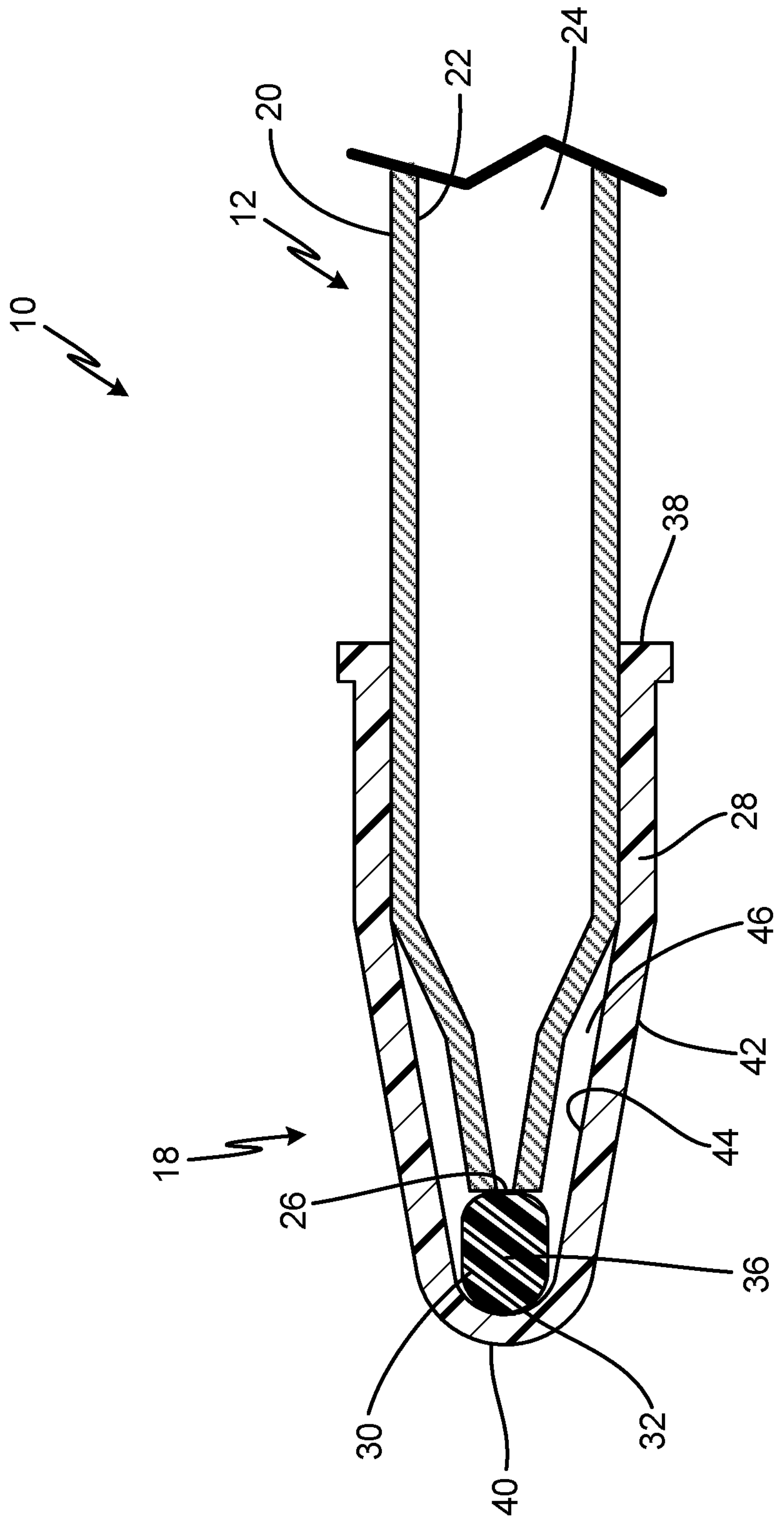
FIG. 2A is a partial cross-sectional view of the cover on the air data probe.
Figure 2B:
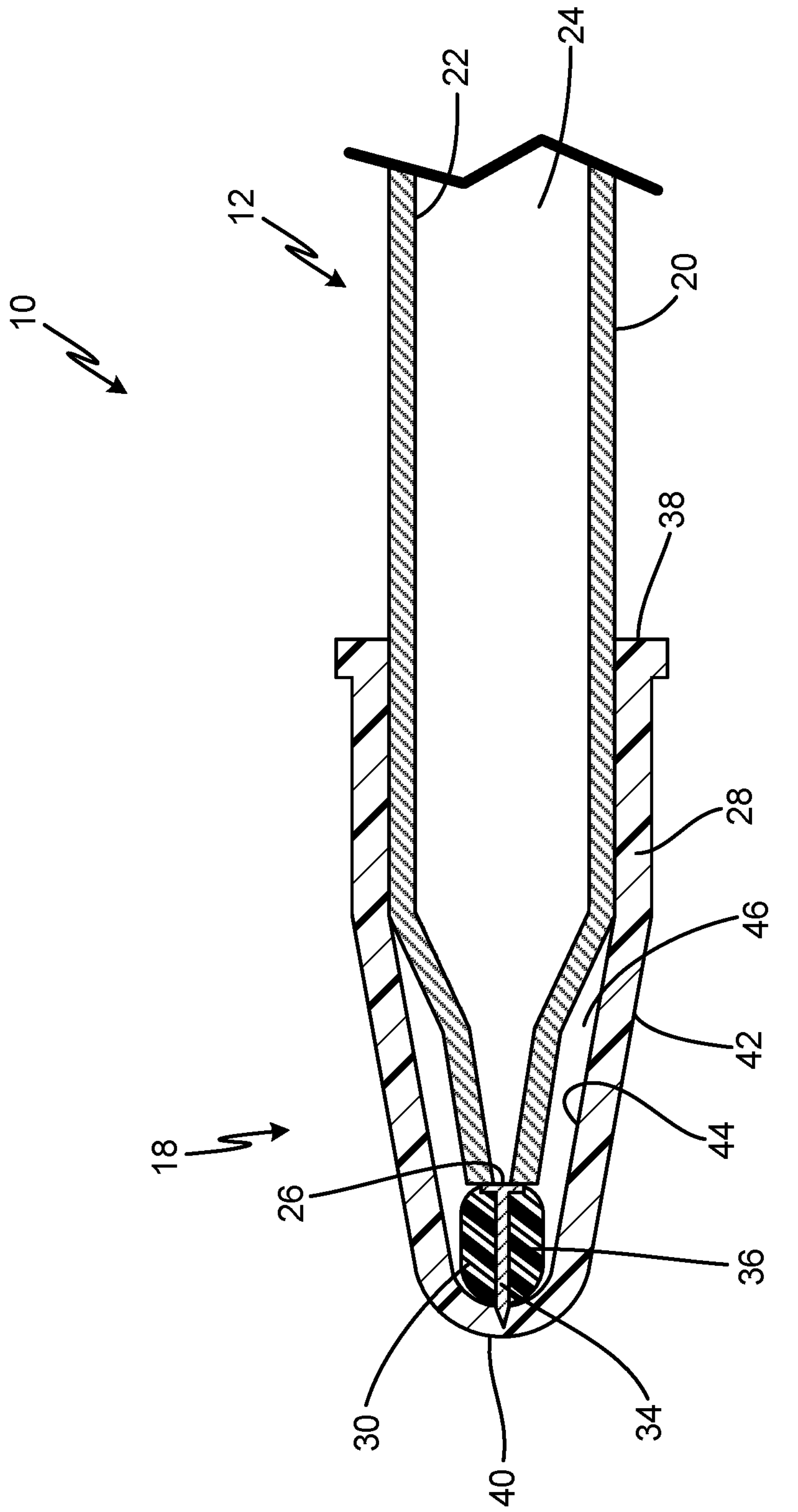
FIG. 2B is a partial cross-sectional view of the cover on the air data probe showing an alternate attachment mechanism.

FIG. 2A is a partial cross-sectional view of cover 18 on air data probe 10. FIG. 2B is a partial cross-sectional view of cover 18 on air data probe 10 showing an alternate attachment mechanism. FIGS. 2A and 2B will be discussed together. Air data probe 10 includes probe head 12. Probe head 12 includes exterior surface 20, interior surface 22, cavity 24, and opening 26. Cover 18 includes sleeve 28, sponge 30, adhesive 32 (or, alternatively, fastener 34), and repellent 36. Sleeve 28 includes open end 38, closed end 40, exterior surface 42, interior surface 44, and cavity 46.

Probe head 12 of air data probe 10 is hollow and substantially cylindrical. Probe head 12 has exterior surface 20 at an exterior of probe head 12 and interior surface 22 at an interior of probe head 12. Interior surface 22 defines cavity 24 of probe head 12. Cavity 24 is the space within hollow probe head 12. Cavity 24 extends through probe head 12 from opening 26. Opening 26 is a port in an end of probe head 12.

In this embodiment, sleeve 28 is tubular and is made of plastic. In alternate embodiments, sleeve 28 may be made of metal or any other suitable material. In FIG. 2A, sponge 30 is attached to sleeve 28 via adhesive 32. As such, adhesive 32 is between sponge 30 and sleeve 28. Alternatively, sponge 30 may be attached to sleeve 28 via fastener 34, such as a screw, as shown in FIG. 2B. As such, fastener 34 extends through sponge 30 and into sleeve 28. In alternate embodiments, sponge 30 may be attached to sleeve 28 via any suitable attachment mechanism. Sponge 30 is a reservoir. In alternate embodiments, sponge 30 may be any suitable reservoir.

Repellent 36 is stored, or held, within sponge 30. For example, sponge 30 may be soaked in repellent 36. Repellent 36 is a chemical insect repellent, but may be any suitable insect repellent. Repellent 36 has a life expectation that allows for a residual amount of repellent 36 to remain on surfaces, or have a residual effect, for up to 12 hours. Repellent 36 may be a fluid or a gel. Sponge 30 holds repellent 36 for an extended period of time. For example, sponge 30 may hold repellent 36 for up to one year. Pores on sponge 30 vary based on the type of repellent 36 being used and the desired release rate of repellent 36 from sponge 30. For example, sponge 30 may have pores sized to hold repellent 36 when repellent 36 is a fluid or pores sized to hold repellent 36 when repellent 36 is a gel.

Sleeve 28 has open end 38 at a first end and closed end 40 at an opposite second end. Exterior surface 42 of sleeve 28 is at an exterior of sleeve 28, and interior surface 44 of sleeve 28 is at an interior of sleeve 28. Exterior surface 42 extends from open end 38 to closed end 40. Interior surface 44 extends from open end 38 to closed end 40. Interior surface 44 defines cavity 46 of sleeve 28 of cover 18. Sponge 30 is located adjacent interior surface 44 at closed end 40. More specifically, sponge 30 is attached within cavity 46 to interior surface 44 of sleeve 28 at closed end 40. In embodiments including adhesive 32, adhesive 32 is attached to sponge 30 and interior surface 44 such that adhesive 32 is located between sponge 30 and interior surface 44 at closed end 40. In embodiments including fastener 34, fastener 34 extends through sponge 30 and interior surface 44 of cover 18 and into closed end 40.

Cover 18 is placed on probe head 12 at the end of probe head 12 having opening 26. When cover 18 is on probe head 12, probe head 12 extends into cavity 46 of sleeve 28 of cover 18 such that cavity 46 encloses a portion of probe head 12. When cover 18 is placed on probe head 12, a portion of interior surface 44 of sleeve 28 of cover 18 adjacent open end 38 contacts exterior surface 20 of probe head 12. Cover 18 is sized such that the portion of interior surface 44 of sleeve 28 is in sealing engagement with exterior surface 20 of probe head 12. Further, when cover 18 is placed on probe head 12, sponge 30 contacts probe head 12, including opening 26 of probe head 12. Repellent contained within sponge 30 also contacts probe head 12.

Sponge 30 of cover 18 holds repellent 36 in cover 18. When the aircraft is grounded, cover 18 is placed on probe head 12. When cover 18 is placed on probe head 12, sponge 30 contacts and presses against the end of probe head 12 having opening 26. As a result, sponge 30 releases a portion of repellent 36 onto probe head 12. Repellent 36 disperses over a portion of probe head 12 adjacent opening 26 of probe head 12. For example, repellent 36 may migrate over exterior surface 20 of probe head 12 adjacent opening 26 and over interior surface 22 adjacent opening 26. Cover 18 is subsequently removed from probe head 12, exposing opening 26 of probe head 12. After cover 18 is removed from probe head 12, repellent 36 remains on probe head 12 for a period of time. For example, repellent 36 may remain on probe head 12 for twelve or more hours. When repellent 36 is a gel, repellent 36 may stay on probe head 12 for a longer period of time. Repellent 36 deters insects from entering probe head 12 at opening 26.

After cover 18 is removed from probe head 12, a portion of repellent 36 may stay in sponge 30 such that cover 18 may be placed on probe head 12 again, or on another probe head 12, to disperse repellent 36. As such, cover 18 may contain enough repellent 36 for multiple uses of cover 18. In alternate embodiments, after cover 18 is removed, sponge 30 may no longer contain repellent 36. In such an embodiment, an entirety of repellent 36 is released from sponge 30 when cover 18 is placed on probe head 12. Sponge 30 may be removable when cover 18 is removed from probe head 12 such that sponge 30 can be replaced with a new sponge 30 or refilled with repellent 36. The amount of repellent 36 dispersed may depend on the potency of repellent 36, as enough repellent 36 is released to deter insects from probe head 12 for a desired period of time.

When aircraft are being prepared for use, covers are removed from air data probes 10. If covers are not taken off of air data probes 10 before starting the aircraft, the air data probes 10 will not function properly, and covers may melt. As such, air data probes 10 are not covered by a cover for a period of time before the aircraft takes flight. Additionally, covers may be left off of air data probes 10 between flights or while the aircraft is parked overnight. Without covers, openings 26 of probe heads 12 of air data probes 10 are exposed. When an aircraft is grounded, insects can enter air data probes 10 via exposed openings 26. For example, when probe head 12 is still warm post-flight, a bug may be particularly attracted to cavity 24. The bug can enter cavity 24 of probe head 12 via opening 26 and travel down cavity 24 further into air data probe 10. If insects enter probe head 12, they can build nests inside air data probe 10 in a short amount of time, bringing contaminants such as mud, dirt, or other debris into air data probe 10. Such contaminants can block air data probe 10. For example, the contaminants, or pieces of the nest, may move into sensors or other components of air data probe 10, damaging internal components of air data probe 10 and preventing air data probe 10 from generating accurate measurements. Inhibition of performance of air data probe 10 can cause loss of operation of the aircraft or aircraft failures. As such, problems with air data probes 10 may necessitate grounding the aircraft to replace the air data probes 10.

When an aircraft is ready for use, cover 18 is removed from probe head 12. Because repellent 36 remains on probe head 12 after cover 18 is removed, repellent 36 deters insects, or other live creatures, from probe head 12. As a result, repellent 36 keeps insects away from and out of probe head 12 before flight, between flights, while the aircraft is parked overnight, or during any other period of time when the aircraft is grounded and cover 18 is not on probe head 12. Thus, insects are prevented from building nests inside air data probe 10, which would inhibit the performance of air data probe 10, when opening 26 is exposed. Cover 18 protects air data probe 10 even after cover 18 is removed, allowing for safer operation of the aircraft.

Figure 3:
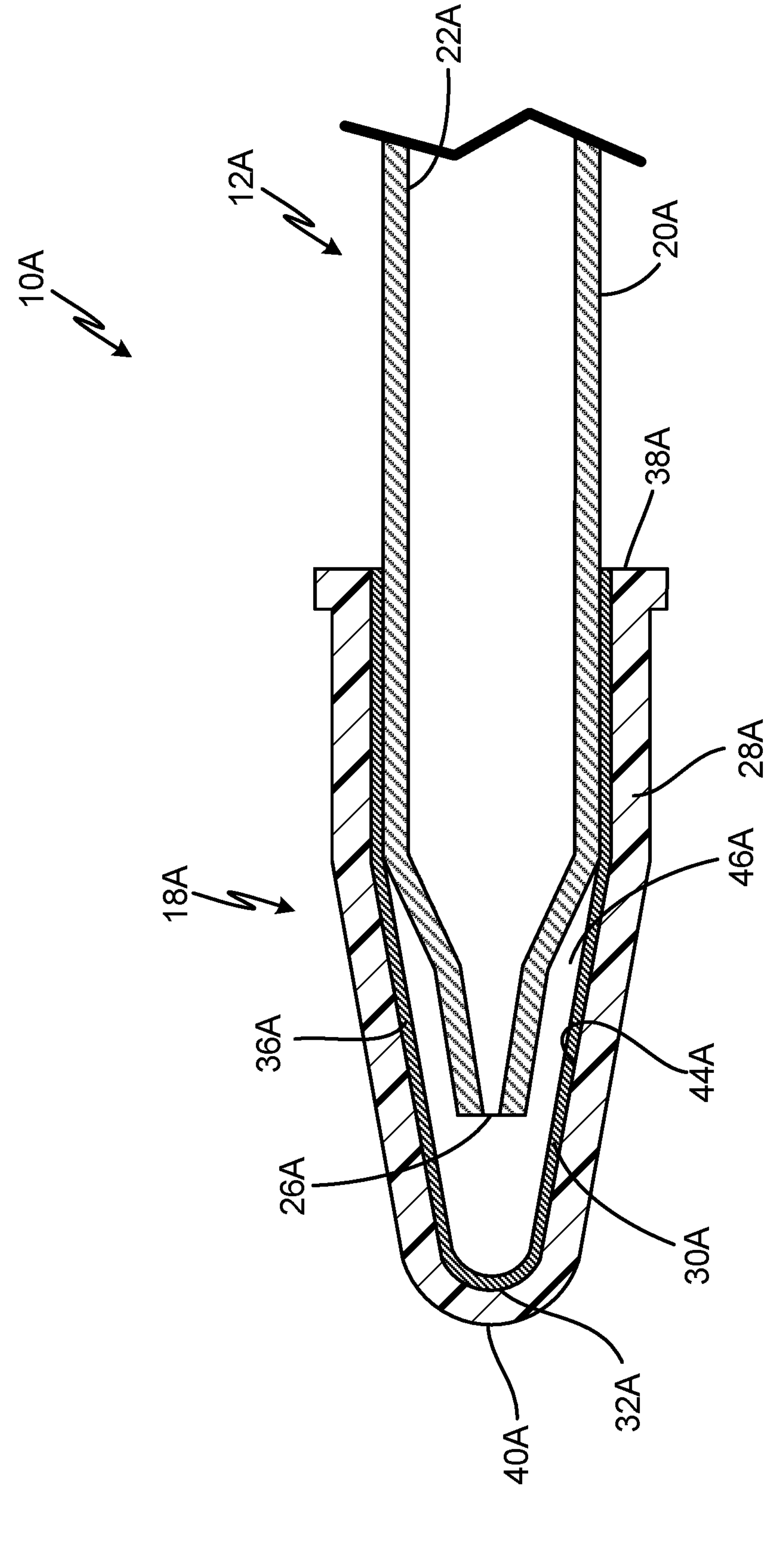
FIG. 3 is a partial cross-sectional view of a cover on the air data probe showing a sleeve as a reservoir.

FIG. 3 is a partial cross-sectional view of cover 18A on air data probe 10A showing liner 30A as a reservoir. Air data probe 10A includes probe head 12A, which has exterior surface 20A, interior surface 22A, and opening 26A. Cover 18A includes sleeve 28A, liner 30A, adhesive 32A, and repellent 36A. Sleeve 28A includes open end 38A, closed end 40A, interior surface 44A, and cavity 46A.

Probe head 12A has the same structure and function as described in reference to probe head 12 in FIGS. 2A and 2B. Cover 18A has the same structure and function as described in reference to cover 18 in FIGS. 2A and 2B except that instead of sponge 30, cover 18A has liner 30A that acts as a reservoir. In this embodiment, liner 30A is attached via adhesive 32A to interior surface 44A of sleeve 28A. As such, adhesive 32A is attached to liner 30A and interior surface 44A such that adhesive 32A is located between liner 30A and interior surface 44A of sleeve 28A. In alternate embodiments, liner 30A may be attached to sleeve 28A via a fastener or any other suitable attachment mechanism. Liner 30A is located adjacent interior surface 44A at closed end 40A of sleeve 28A and is within cavity 46A. In this embodiment, liner 30A covers, or extends over, about an entirety of interior surface 44A of sleeve 28A of cover 18A. As such, liner 30A extends from closed end 40A to open end 38A. In alternate embodiments, liner 30A may only cover, or extend across, a portion of interior surface 44A of sleeve 28A adjacent closed end 40A. Liner 30A is a reservoir for storing repellent 36A. Liner 30A may be made of a fabric that holds repellent 36A. Fabric of liner 30A may be porous, the pores varying based on the type of repellent 36A being used and the desired release rate of repellent 36A from liner 30A. For example, liner 30A may be impregnated with repellent 36A and be porous to repellent 36A. Liner 30A may also be soaked with repellent 36A. Liner 30A holds repellent 36A for an extended period of time.

When cover 18A is placed on probe head 12A, a portion of interior surface 44A adjacent open end 38A and a portion of exterior surface 20A sandwich a portion of liner 30A between cover 18A and interior surface 44A. Cover 18A is sized such that the portion of interior surface 44A is in sealing engagement with the portion of exterior surface 30A of probe head 12A. When cover 18A is placed on probe head 12A, a portion of liner 30A adjacent closed end 40A is not sandwiched by cover 18A and probe head 12A. When cover 18A is placed on probe head 12A, repellent 36A within liner 30A vaporizes. Repellent 36A is then released from the porous fabric of liner 30A as a vapor that fills cavity 46A. Repellent 36A in cavity 46A condenses on probe head 12A, contacting probe head 12A.

Liner 30A of cover 18A holds repellent 36A in cover 18A. When cover 18A is placed on probe head 12A, liner 30A releases repellent 36A as a vapor to fill cavity 46A, which encloses a portion of probe head 12A having opening 26A. As such, repellent 36A disperses and condenses on probe head 12A adjacent opening 26A. For example, repellent 36A may condense over exterior surface 20A of probe head 12A adjacent opening 26A and over interior surface 22A adjacent opening 26A. After cover 18A is removed from probe head 12A, repellent 36A remains on probe head 12A for a period of time. Repellent 36A deters insects from entering probe head 12A at opening 26A.

When cover 18A is removed from probe head 12A, repellent 36A remains on a larger portion of exterior surface 20A of probe head 12A because liner 30A releases repellent 36A from a larger portion of interior surface 44A. As such, repellent 36A deters insects, and other live creatures, from probe head 12 over a larger surface area of probe head 12A.

Figure 4:
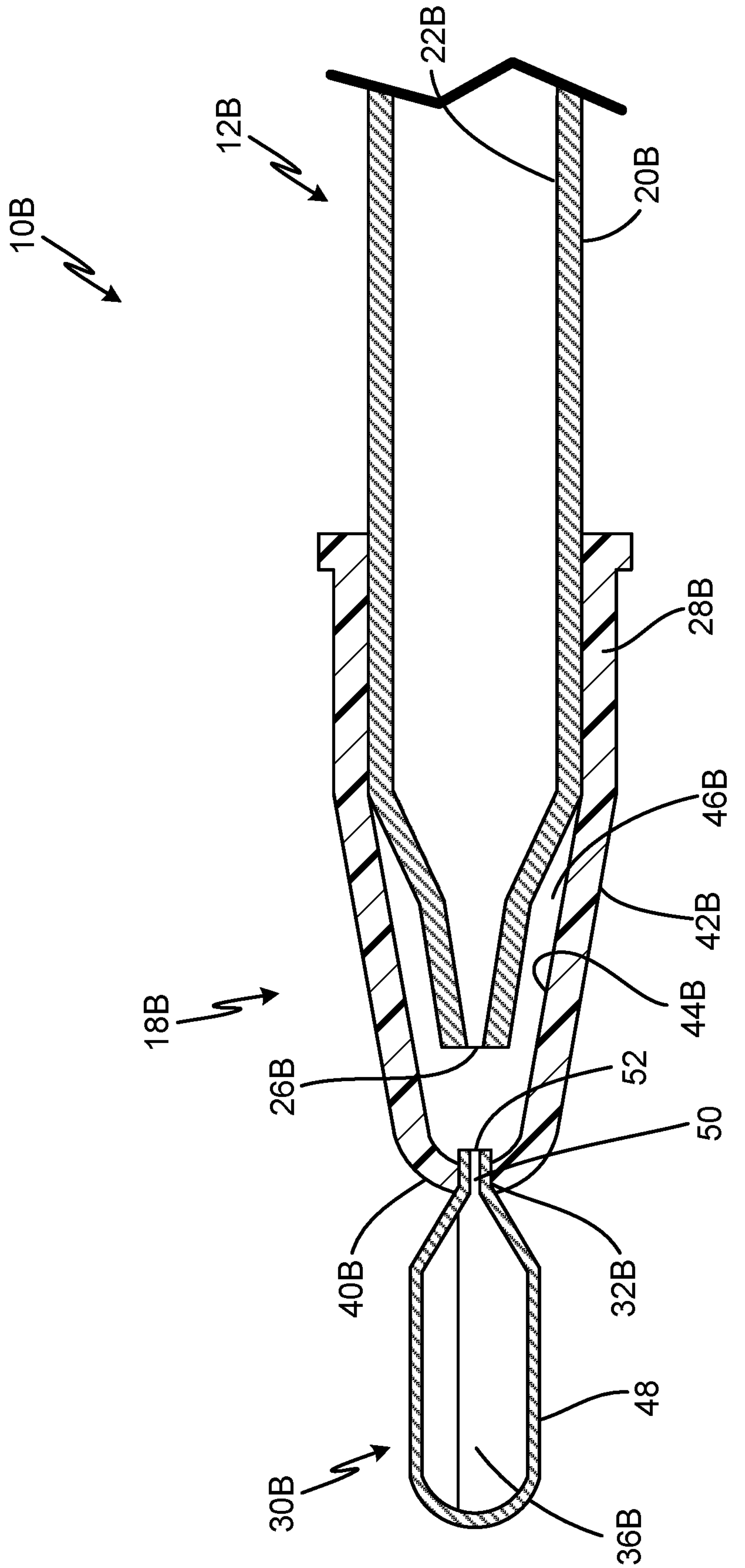
FIG. 4 is a partial cross-sectional view of a cover on the air data probe showing a bottle as a reservoir.

FIG. 4 is a partial cross-sectional view of cover 18B on air data probe 10B showing bottle 30B as a reservoir. Air data probe 10B includes probe head 12B. Probe head 12B includes exterior surface 20B, interior surface 22B, and opening 26B. Cover 18B includes sleeve 28B, bottle 30B, adhesive 32B, and repellent 36B. Sleeve 28B includes closed end 40B, exterior surface 42B, interior surface 44B, and cavity 46B. Bottle 30B includes body 48, neck 50, and mouth 52.

Probe head 12B has the same structure and function as described in reference to probe head 12 in FIGS. 2A and 2B. Cover 18B has the same structure and function as described in reference to cover 18 in FIGS. 2A and 2B except that instead of sponge 30, cover 18B has bottle 30B that acts as a reservoir. In this embodiment, bottle 30B is attached to sleeve 28B via adhesive 32B. As such, adhesive 32B is between bottle 30B and sleeve 28B. Alternatively, bottle 30B may be attached to sleeve 28B via an interference fit between bottle 30B and sleeve 28B. In alternate embodiments, bottle 30B may be attached to sleeve 28B via any suitable attachment mechanism. Bottle 30B is squeezable, transparent, and can vary in size. Repellent 36B is stored within bottle 30B. Bottle 30B is located adjacent exterior surface 42B at closed end 40B of sleeve 28B and interior surface 44B of closed end 40B of sleeve 28B. More specifically, a portion of bottle 30B is exterior to sleeve 28B, a portion of bottle 30B extends through closed end 40B of sleeve 28B from exterior surface 42B to interior surface 44B, and a portion of bottle 30B is located within cavity 46B.

Bottle 30B has hollow body 48, which holds repellent 36B. Body 48 is located exterior to sleeve 28B. Body 48 is connected to a first end of neck 50. Neck 50 is also hollow and is in fluid communication with body 48. As such, neck 50 also holds repellent 36B. Neck 50 extends through closed end 40B of sleeve 28B from exterior surface 42B to interior surface 44B. Neck 50 extends into cavity 46B. A second end of neck 50 defines mouth 52, which is positioned in cavity 46B. Mouth 52 is an opening of bottle 30. Mouth 52 is spaced from opening 26B of probe head 12B when cover 18B is placed on probe head 12B. Bottle 30B can hold repellent 36B for an extended period of time. Repellent 36B is dispersed from bottle 30B at mouth 52 to contact probe head 12.

In embodiments including adhesive 32B, adhesive 32B is attached to neck 50 and closed end 40B of sleeve 28 such that adhesive 32B is located between neck 50 and closed end 40B of sleeve 28. In embodiments not including adhesive 32B, the interference fit or threaded connection between closed end 40B of sleeve 28B and neck 50 sealingly connects bottle 30B to sleeve 28B.

Bottle 30B of cover 18B holds repellent 36B in cover 18B. When cover 18B is placed on probe head 12B, bottle 30B may be squeezed, or compressed, to release repellent 36B. Likewise, before cover 18B is removed from probe head 12B, bottle 30B is squeezed, or compressed to release repellent 36B. Bottle 30B may be squeezed manually. When bottle 30B is squeezed, or compressed, a portion of repellent 36B is released from mouth 52 onto probe head 12B. Repellent 36B disperses over a portion of probe head 12B adjacent opening 26B of probe head 12B. For example, repellent 36B may disperse onto exterior surface 20B of probe head 12B adjacent opening 26B and over interior surface 22B adjacent opening 26B. After cover 18B is removed from probe head 12B, repellent 36B remains on probe head 12B for a period of time. Repellent 36B deters insects, or other live creatures, from entering probe head 12B at opening 26B.

After cover 18B is removed from probe head 12B, a portion of repellent 36B may remain in bottle 30B such that cover 18B may be placed on probe head 12B again, or on another probe head 12B, to disperse repellent 36B. Thus, cover 18B may contain repellent 36B for multiple uses of cover 18B. In alternate embodiments, after cover 18B is removed, bottle 30B may no longer contain repellent 36B. Bottle 30B may be removable such that bottle 30B can be replaced with a new bottle 30B or refilled with repellent 36B.

Because an entirety of bottle 30B does not have to fit within cavity 46B, bottle 30B may be a larger sized reservoir. Therefore, bottle 30B can hold a greater amount of repellent 36B. With more repellent 36B, cover 18B can be used for a longer period of time and/or more repellent 36B can be dispersed onto probe head 12B. Additionally, because bottle 30B is transparent and body 48 is exterior to sleeve 28B, a user can quickly and easily see the amount of repellent remaining within bottle 30B without having to remover cover 18B. Because repellent 36B in bottle 30B can be manually dispersed, the dispersal of repellent 36B is more controllable. For example, the amount of repellent 36B dispersed can be controlled. Further, the compression force can be adjusted to adjust the distance repellent 36B is dispersed onto probe head 12B.

Figure 5:
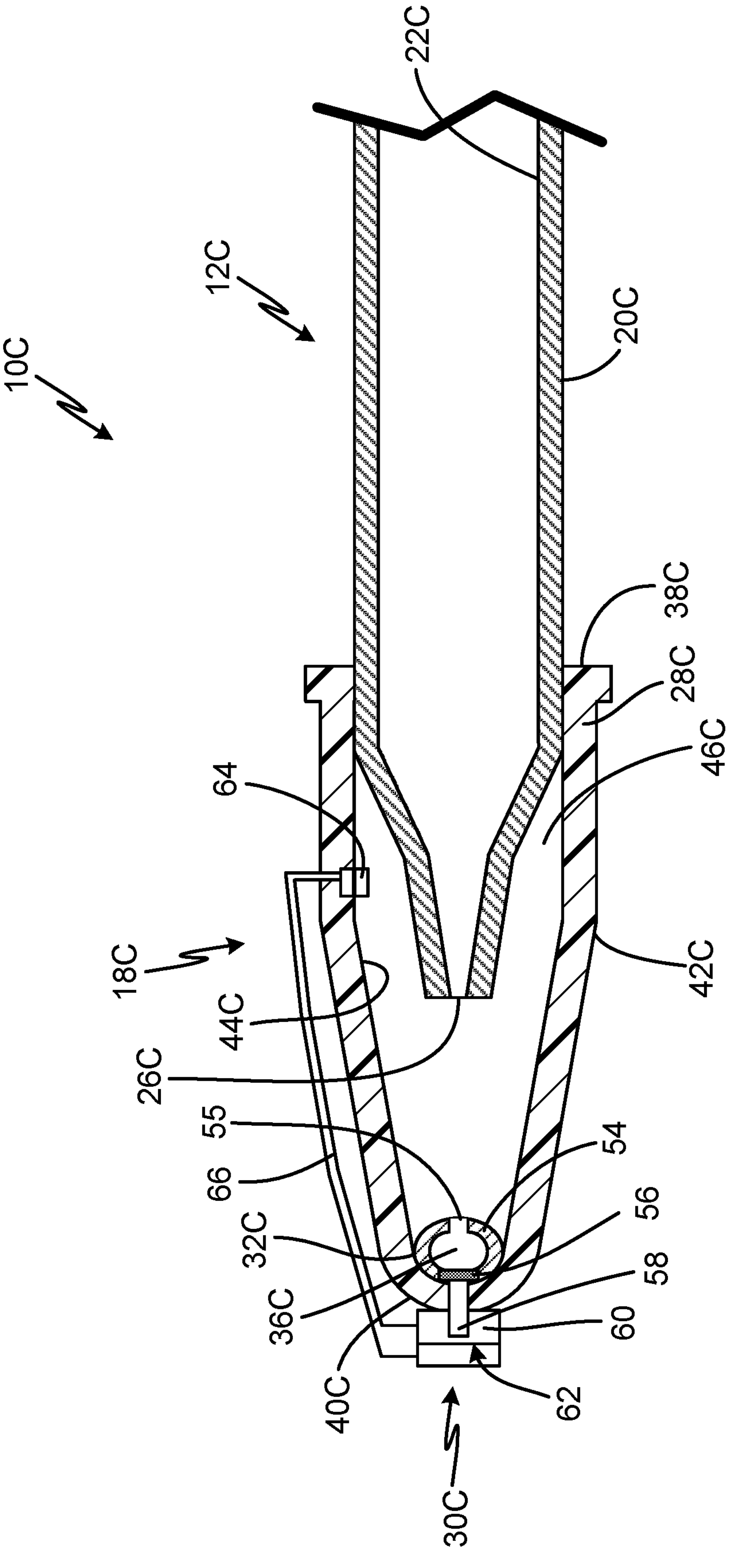
FIG. 5 is a partial cross-sectional view of a cover partially placed on the air data probe showing an electrically-actuated reservoir.

FIG. 5 is a partial cross-sectional view of cover 18C partially placed on air data probe 10C showing electrically-actuated reservoir 30C. Air data probe 10C includes probe head 12C. Probe head 12C includes exterior surface 20C, interior surface 22C, and opening 26C. Cover 18C includes sleeve 28C, electrically-actuated reservoir 30C, adhesive 32C, and repellent 36C. Sleeve 28C includes open end 38C, closed end 40C, exterior surface 42C, interior surface 44C, and cavity 46C. Electrically-actuated reservoir 30C includes container 54 (having nozzle 55 and diaphragm 56), plunger 58, driver 60, battery 62, switch 64, and wire connection 66.

Probe head 12C has the same structure and function as described in reference to probe head 12 in FIGS. 2A and 2B. Cover 18C has the same structure and function as described in reference to cover 18 in FIGS. 2A and 2B except that instead of sponge 30, cover 18C has electrically-actuated reservoir 30C acting as a reservoir. In this embodiment, electrically-actuated reservoir 30C is attached to sleeve 28C via adhesive 32C. As such, adhesive 32C is between electrically-actuated reservoir 30C and sleeve 28C. In alternate embodiments, electrically-actuated reservoir 30C may be attached to sleeve 28C via any suitable attachment mechanism. Repellent 36C is stored within electrically-actuated reservoir 30C. Electrically-actuated reservoir 30C is located adjacent exterior surface 42C at closed end 40C of sleeve 28C and interior surface 44C at closed end 40C of sleeve 28C. Additionally, a portion of electrically-actuated reservoir 30C is located adjacent exterior surface 42C near open end 38C and a portion of electrically-actuated reservoir 30C is located adjacent interior surface 44C near open end 38C. More specifically, a portion of electrically-actuated reservoir 30C is exterior to sleeve 28C, a portion of electrically-actuated reservoir 30C extends through sleeve 28C from exterior surface 42C to interior surface 44C, and a portion of electrically-actuated reservoir 30C is located within cavity 46C.

Electrically-actuated reservoir 30C has container 54, which holds repellent 36C. Container 54 is located interior to sleeve 28C in cavity 46C. Container 54 is spaced from opening 26C of probe head 12C when cover 18C is fully placed on probe head 12C. Container 54 has nozzle 55, which is an opening in a side of container 54 facing opening 26C of probe head 12C. Repellent 36C is dispersed from container 54 at nozzle 55 to contact probe head 12C. Container 54 has diaphragm 56 defining a side of container 54 opposite the side of container 54 having nozzle 55. As such, diaphragm 56 is makes up a side of container 54 facing closed end 40C of sleeve 28C. Diaphragm 56 is adjacent plunger 58, which extends through closed end 40C from interior surface 44C to exterior surface 42C. A first side of plunger 58 is interior to sleeve 28C and located within cavity 46C adjacent diaphragm 56. A second side of plunger 58 is exterior to sleeve 28C and is connected to driver 60. Driver 60 is an electromechanical driver having a first end connected to exterior surface 42C of sleeve 28C at closed end 40C. A second end of driver 60 is connected to battery 62. Driver 60 may be a solenoid, a motor, or any other electrically driven device that can apply force to container 54. Battery 62 is also connected to switch 64 via wire connection 66. Switch 64 is a contact switch that extends into cavity 46C from interior surface 44C of sleeve 28C when cover 18C is not fully placed or positioned on probe head 12C, as shown in FIG. 5. Wire connection 66 has a first wire with a first end attached to battery 62 and a second end attached to switch 64, and a second wire with a first end attached to driver 60 and a second end attached to switch 64. Driver 60, battery 62, power switch 64, and wire connection 66 make up an electrical circuit.

Electrically-actuated reservoir 30C of cover 18C holds repellent 36C in cover 18C. When cover 18C is fully placed on probe head 12C, switch 64 is depressed, or pushed, to close, or complete, the circuit including wire connection 66, battery 62, and driver 60. As such, switch 64 controls the flow of current to driver 60. When switch 64 is not depressed and the circuit is not complete, the flow of current from battery 62 to driver 60 is prevented. When switch 64 closes the circuit, electric power is delivered from battery 62 to driver 60. Battery 62 energizes driver 60. When driver 60 is powered, plunger 58 is actuated and moves toward diaphragm 56 to push against, or apply pressure to, diaphragm 56. Diaphragm 56 is pushed toward nozzle 55, decreasing the space within container 54 and releasing repellent 36C through nozzle 55 onto probe head 12C. Repellent 36C disperses over a portion of probe head 12C adjacent opening 26C of probe head 12C. For example, repellent 36C may disperse onto exterior surface 20C adjacent opening 26C and over interior surface 22C adjacent opening 26C. After cover 18C is removed from probe head 12C, repellent 36C remains on probe head 12C for a period of time. Repellent 36C deters insects, or other live creatures, from entering probe head 12C at opening 26C.

Electrically-actuated reservoir 30C automatically disperses repellent 36C such that a user need not remember to disperse repellent 36C. Further, battery 62 will not power driver 60 to actuate plunger 58 until switch 64 closes. Release of repellent 36C is delayed until cover 18C is fully positioned on probe head 12C, resulting in more precise release of repellent 36C.

Figure 6:
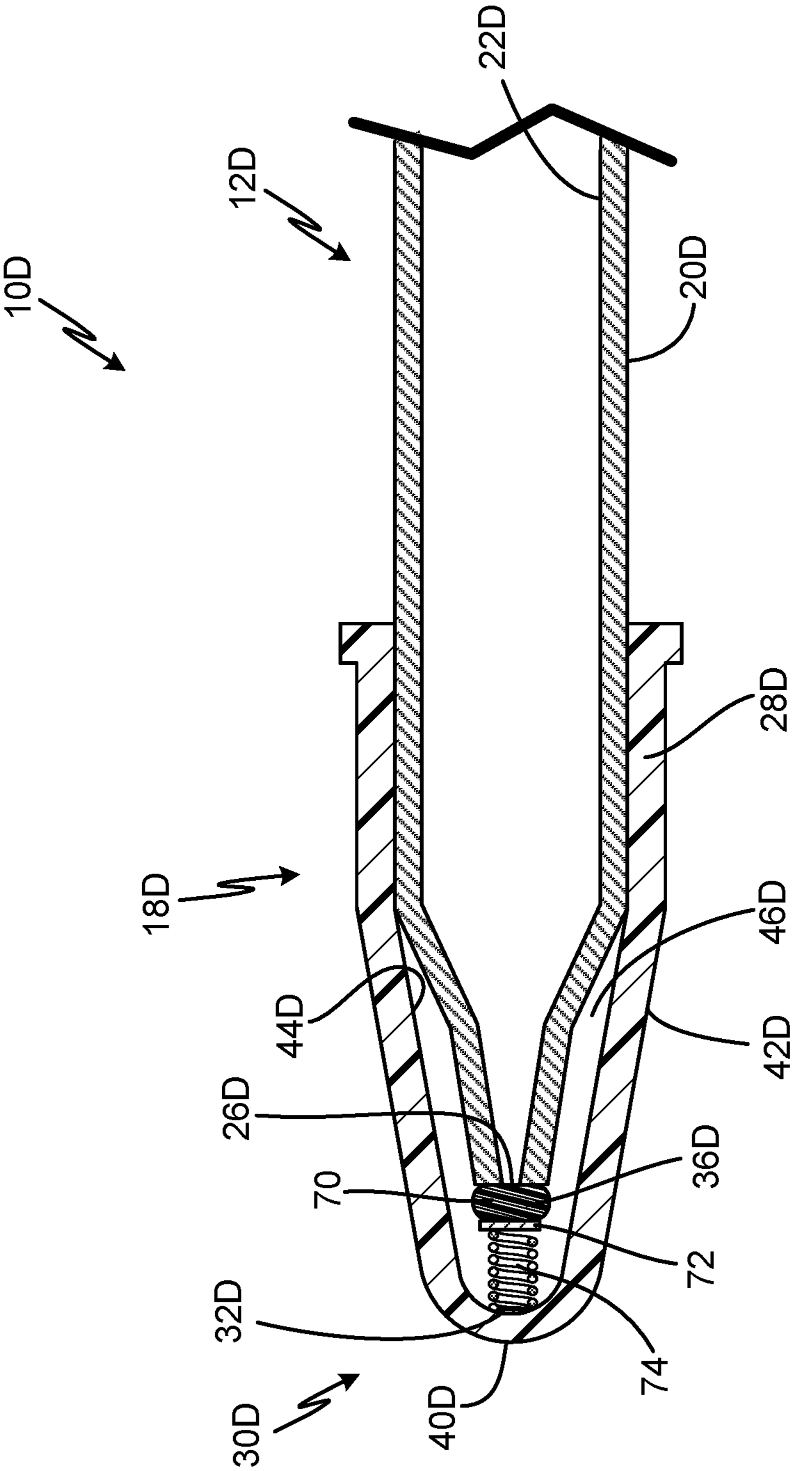
FIG. 6 is a partial cross-sectional view of a cover on the air data probe showing a spring-actuated reservoir.

FIG. 6 is a partial cross-sectional view of cover 18D on air data probe 10D showing spring-actuated reservoir 30D. Air data probe 10D includes probe head 12D. Probe head 12D includes exterior surface 20D, interior surface 22D, and opening 26D. Cover 18D includes sleeve 28D, spring-actuated reservoir 30D, adhesive 32D, and repellent 36D. Sleeve 28D includes closed end 40D, exterior surface 42D, interior surface 44D, and cavity 46D. Spring-actuated reservoir 30D includes sponge 70, drive plate 72, and spring 74.

Probe head 12D has the same structure and function as described in reference to probe head 12 in FIGS. 2A and 2B. Cover 18D has the same structure and function as described in reference to cover 18 in FIGS. 2A and 2B except that instead of sponge 30, cover 18D has spring-actuated reservoir 30D acting as a reservoir. In this embodiment, spring-actuated reservoir 30D is attached to sleeve 28D via adhesive 32D. As such, adhesive 32D is between spring-actuated reservoir 30D and sleeve 28D. In alternate embodiments, spring-actuated reservoir 30D may be attached to sleeve 28D via any suitable attachment mechanism. Repellent 36D is stored within spring-actuated reservoir 30D. Spring-actuated reservoir 30D is located adjacent interior surface 44D of closed end 40D of sleeve 28D within cavity 46D.

Spring-actuated reservoir 30D has sponge 70, which holds repellent 36D. In alternate embodiments, sponge 70 may be any suitable reservoir for holding repellent 36D. Sponge 70 is attached to interior surface 44D of sleeve 28D at closed end 40D via drive plate 72 and spring 74. Sponge 70 is attached to drive plate 72. Drive plate 72 is a flat plate with a greater cross-sectional area than spring 74. Drive plate 72 has a first side attached to sponge 70 and a second side attached to spring 74. Spring 74 has a first side attached to drive plate 72 and a second side attached to interior surface 44D of sleeve 28D at closed end 40D.

Spring-actuated reservoir 30D of cover 18D holds repellent 36D in cover 18D. Before cover 18D is placed on probe head 12D, spring 74 is in a relaxed state. When cover 18D is placed on probe head 12D, as shown in FIG. 6, sponge 70 contacts probe head 12D near opening 26D to release repellent 36D onto probe head 12D. Further, when cover 18D is placed on probe head 12D, spring 74 compresses and applies force to drive plate 72. Drive plate 72 applies the force from spring 74 to sponge 70, further compressing sponge 70 against probe head 12D. Drive plate 72 has a greater cross-sectional area than spring 74 such that drive plate 72 spreads the force from spring 74 over a greater area of sponge 70. Repellent 36D disperses over a portion of probe head 12D adjacent opening 26D of probe head 12D. For example, repellent 36D may disperse onto exterior surface 20D adjacent opening 26D and over interior surface 22D adjacent opening 26D. After cover 18D is removed from probe head 12D, repellent 36D remains on probe head 12D for a period of time. Repellent 36D deters insects, or other live creatures, from entering probe head 12D at opening 26D.

Spring 74 maintains a greater force on sponge 70, pushing sponge 70 against probe head 12D and compressing sponge 70 to a greater extent. As a result, sponge 70 may release a greater amount of repellent 36D such that more repellent 36D can be dispersed onto probe head 12D.

While sponge 30, liner 30A, bottle 30B, electrically-actuated reservoir 30C, and spring-actuated reservoir 30D have been described as reservoirs for holding and dispersing repellent 36, 36A, 36B, 36C, and 36D, cover 18, 18A, 18B, 18C, and 18D may include any suitable reservoir located, at least partially, within cavity 46 of sleeve 28, 28A, and 28B. For example, cover 18 may include a spring-operated reservoir with a spring that loads, or arms, when the cover is placed on the probe head and actuates when the cover is removed from the probe head. In such an embodiment, the spring may actuate the spring-operated reservoir by moving backward, applying the force necessary to spray repellent. Additionally, the electrically-actuated reservoir may include a pump to disperse repellent from a repellent-filled container at a constant rate or after designated time periods. The reservoirs may also be fully inside the cavity of the sleeve of the cover or partially exterior to the sleeve of the cover.

While covers 18, 18A, 18B, 18C, and 18D have been described in reference to air data probes 10 (shown in FIG. 1 as a pitot probe), 10A, 10B, 10DC, and 10D, covers 18, 18A, 18B, 18C, and 18D may be configured to cover various devices that provide measurement of barometric static pressure, altitude, air speed, angle of attack, angle of sideslip, temperature, total air temperature, relative humidity, and/or any other suitable parameter of interest.

Discussion of Possible Embodiments

The following are non-exclusive descriptions of possible embodiments of the present invention.

A cover for a probe head of an air data probe, the cover comprising: a sleeve defining a cavity for enclosing a portion of the probe head of the air data probe, the sleeve including: a closed end; an open end opposite the closed end; and an interior surface extending from the open end to the closed end; and a reservoir for holding insect repellent, the reservoir located at least partially within the cavity of the sleeve.

The cover of the preceding paragraph can optionally include, additionally and/or alternatively, any one or more of the following features, configurations and/or additional components:

The reservoir is positioned to disperse insect repellent on the probe head adjacent an opening of the probe head.

The insect repellent is configured to deter insects from entering the probe head when the cover is removed from the probe head.

The reservoir is a sponge attached to the interior surface at the closed end of the sleeve.

A fastener extending through the sponge and the interior surface of the sleeve and into the closed end of the sleeve.

The sponge has pores sized to hold the insect repellent when the insect repellent is a fluid.

The sponge has pores sized to hold the insect repellent when the insect repellent is a gel.

Adhesive located between the reservoir and the closed end of the sleeve.

The reservoir is a liner attached to and extending over the interior surface of the sleeve.

The liner extends over about an entirety of the interior surface of the sleeve.

The reservoir is a bottle including: a body located exterior to the sleeve; and a neck extending through the closed end of the sleeve, the neck defining a mouth positioned within the cavity of the sleeve.

The reservoir is electrically-actuated.

The reservoir is spring-actuated.

A method for repelling insects from an opening of an air data probe, the method comprising: placing a cover on a probe head of the air data probe, the cover including a reservoir for holding insect repellent; dispersing the insect repellent from the reservoir onto the probe head; and removing the cover from the probe head.

The method of the preceding paragraph can optionally include, additionally and/or alternatively, any one or more of the following features, configurations and/or additional components:

The reservoir is a sponge located within a sleeve of the cover.

The reservoir is a porous liner located within a sleeve of the cover.

The reservoir is a bottle connected to the cover.

The reservoir is electrically-actuated.

The reservoir is spring-actuated.

The insect repellent is configured to deter insects from entering the probe head when the cover is removed from the probe head.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A cover for a probe head of an aircraft air data probe that has an opening for taking in air from surrounding airflow to communicate air pressures pneumatically through internal components and passages of the probe head and a strut of the air data probe to generate air data parameters, the cover comprising:

a sleeve defining a cavity for enclosing a portion of the probe head of the air data probe to prevent insects from entering the opening of the probe head when the cover is on the probe head, the sleeve including:

a closed end;

an open end opposite the closed end; and an interior surface extending from the open end to the closed end;

a cylindrical portion extending from the open end; and a tapered portion connected to the cylindrical portion and defining the closed end;

wherein the cylindrical portion is configured to sealingly engage the probe head when the cover is on the probe head; and a reservoir for holding insect repellent, the reservoir located at least partially within the cavity of the sleeve and within the tapered portion and positioned adjacent the opening of the probe head to disperse insect repellent on the probe head adjacent the opening of the probe head when the cover is on the probe head, so that the insect repellant is dispersed within the cavity to produce a residual effect to deter insects from entering the opening of the probe head after the cover is removed from the probe head.

2. The cover of claim 1, wherein the cylindrical portion is configured to sealingly engage the probe head at the open end of the of the sleeve when the cover is on the probe head.

3. The cover of claim 1, wherein the reservoir is a sponge attached to the interior surface at the closed end of the sleeve.

4. The cover of claim 3, wherein the sponge has pores sized to hold the insect repellent when the insect repellent is a fluid or a gel.

5. The cover of claim 1, further including adhesive located between the reservoir and the closed end of the sleeve.

6. A cover for a probe head of an air data probe that has an opening, the cover comprising:

a sleeve defining a cavity for enclosing a portion of the probe head of the air data probe to prevent insects from entering the opening of the probe head when the cover is on the probe head, the sleeve including:

a closed end;

an open end opposite the closed end;

an interior surface extending from the open end to the closed end, wherein a sealing engagement is formed between the interior surface and an exterior surface of the probe head adjacent the open end of the sleeve when the cover is on the probe head;

a cylindrical portion extending from the open end, wherein the cylindrical portion is configured to sealingly engage the probe head when the cover is on the probe head; and a tapered portion connected to the cylindrical portion and defining the closed end; and a reservoir for holding insect repellent, the reservoir located at least partially within the cavity of the sleeve and within the tapered portion such that an open space remains within the cavity when the cover is on the probe head, wherein the open space is between the interior surface of the sleeve and the exterior surface of the probe head and between the closed end of the sleeve and the sealing engagement between the interior surface of the sleeve and the exterior surface of the probe head when the cover is on the probe head, wherein the open space is adjacent the reservoir when the cover is on the probe head, and wherein the reservoir is positioned to disperse insect repellent on the probe head adjacent the opening of the probe head, so that the insect repellant is dispersed within the open space to produce a residual effect to deter insects from entering the opening of the probe head after the cover is removed from the probe head.

7. The cover of claim 6, wherein the reservoir is a sponge attached to the interior surface at the closed end of the sleeve.

8. The cover of claim 7, further including a fastener extending through the sponge and the interior surface of the sleeve and into the closed end of the sleeve.

9. The cover of claim 7, wherein the sponge has pores sized to hold the insect repellent when the insect repellent is a fluid or a gel.

10. The cover of claim 6, further including adhesive located between the reservoir and the closed end of the sleeve.

11. The cover of claim 6 wherein the reservoir is a liner attached to and extending over the interior surface of the sleeve.

12. The cover of claim 11, wherein the liner extends over about an entirety of the interior surface of the sleeve.

13. The cover of claim 6, wherein the reservoir is a bottle including:

a body located exterior to the sleeve; and a neck extending through the closed end of the sleeve, the neck defining a mouth positioned within the cavity of the sleeve.

14. The cover of claim 6, wherein the reservoir is electrically-actuated or spring-actuated.

15. The cover of claim 6, wherein the sealing engagement is adjacent the open end of the sleeve when the cover is on the probe head.

16. A cover for a probe head of an air data probe that has an opening, the cover comprising:

a sleeve defining a cavity for enclosing a portion of the probe head of the air data probe to prevent insects from entering the opening of the probe head when the cover is on the probe head, the sleeve including:

a closed end;

an open end opposite the closed end;

an interior surface extending from the open end to the closed end, wherein a sealing engagement is formed between the interior surface and an exterior surface of the probe head adjacent the open end of the sleeve when the cover is on the probe head;

a cylindrical portion extending from the open end, wherein the cylindrical portion is configured to sealingly engage the probe head when the cover is on the probe head; and a tapered portion connected to the cylindrical portion and defining the closed end; and a reservoir for holding insect repellent, the reservoir located at least partially within the cavity of the sleeve and within the tapered portion such that an open space remains within the cavity when the cover is on the probe head, wherein the open space is between the interior surface of the sleeve and the exterior surface of the probe head and between the closed end of the sleeve and the sealing engagement between the interior surface of the sleeve and the exterior surface of the probe head when the cover is on the probe head, wherein the reservoir contacts the opening of the probe head when the cover is on the probe head, and wherein the reservoir is positioned to disperse insect repellent on the probe head adjacent the opening of the probe head, so that the insect repellant is dispersed within the open space to produce a residual effect to deter insects from entering the opening of the probe head after the cover is removed from the probe head.

17. The cover of claim 16, wherein the sealing engagement is adjacent the open end of the sleeve when the cover is on the probe head.

18. The cover of claim 16, wherein the reservoir is a sponge attached to the interior surface at the closed end of the sleeve.

19. The cover of claim 18, wherein the sponge has pores sized to hold the insect repellent when the insect repellent is a fluid or a gel.

20. The cover of claim 16, further including adhesive located between the reservoir and the closed end of the sleeve.

* * * * *